UNITED STATES PATENT OFFICE.

REUBEN M. ROSE, OF BROOKLYN, NEW YORK.

COMPOSITION FOR BEARINGS.

SPECIFICATION forming part of Letters Patent No. 267,594, dated November 14, 1882.

Application filed September 2, 1882. (No specimens.)

*To all whom it may concern:*

Be it known that I, REUBEN M. ROSE, of the city of Brooklyn, in the county of Kings and State of New York, have invented a new and useful Improvement in Compositions for Bearings, of which the following is a specification.

The object of my invention is to provide a superior composition for bearings, which will work either with or without lubricating material and without cutting, and which is sufficiently elastic to adapt itself to slight inequalities or inaccuracies of fit of the bearing to the axle or journal or to the axle-box or journal-box.

The invention consists in a composition for bearings composed of graphite, lamp-black, and india-rubber, combined, as hereinafter described.

In preparing my composition I take about the following quantities, by weight, of the several ingredients: india-rubber, about two parts; graphite, about two parts; lamp-black, about eight parts; but the proportions of the several ingredients may be considerably varied without departing from my invention, and the quantities of graphite and lamp-black especially may be very largely increased. The india-rubber which I employ I obtain from the india-rubber manufacturers, and I procure it prepared for vulcanization, with as large a proportion of sulphur as the rubber will bear for its conversion into hard rubber. The graphite and lamp-black are both in a granular or powdered state. The several ingredients are then incorporated thoroughly together by grinding, or in any other suitable manner, and the composition is put into molds, or otherwise formed into the shape desired, and is then subjected to a sufficient heat to vulcanize the india-rubber. The vulcanized india-rubber securely binds the other ingredients and prevents disintegration of the bearing, and the bearing is elastic to a desirable degree.

What I claim as my invention, and desire to secure by Letters Patent, is—

The composition for bearings composed of india-rubber, graphite, and lamp-black, combined as herein described, and for the purpose set forth.

REUBEN M. ROSE.

Witnesses:
H. C. DEMOREST,
W. C. DEMOREST.